Dec. 27, 1932.  O. I. JUDELSHON  1,892,058
CLOTH CUTTING MACHINE
Filed Jan. 6, 1931  6 Sheets-Sheet 2
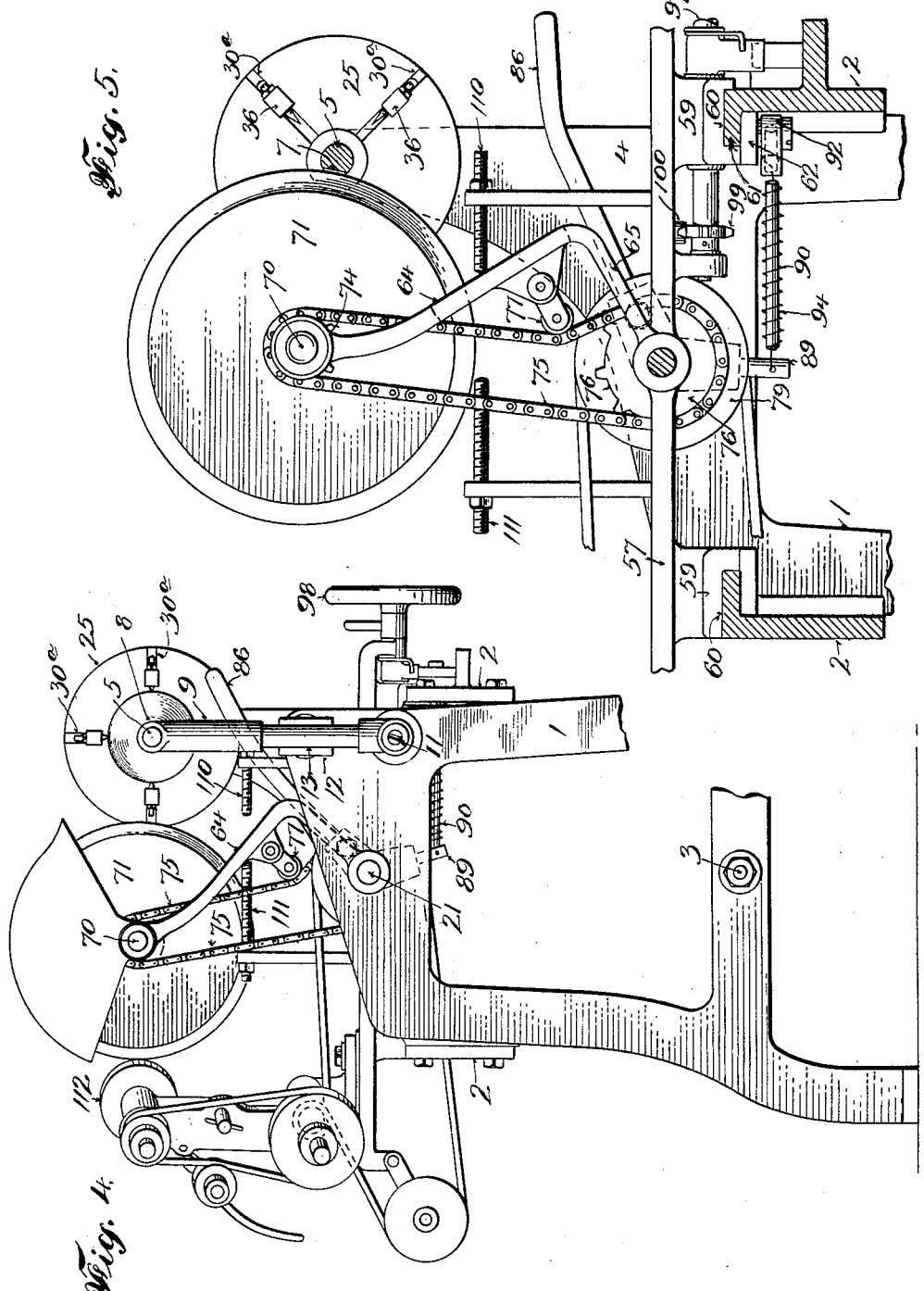
INVENTOR
Oscar I. Judelshon
BY
Charles G. Hensley
ATTORNEY

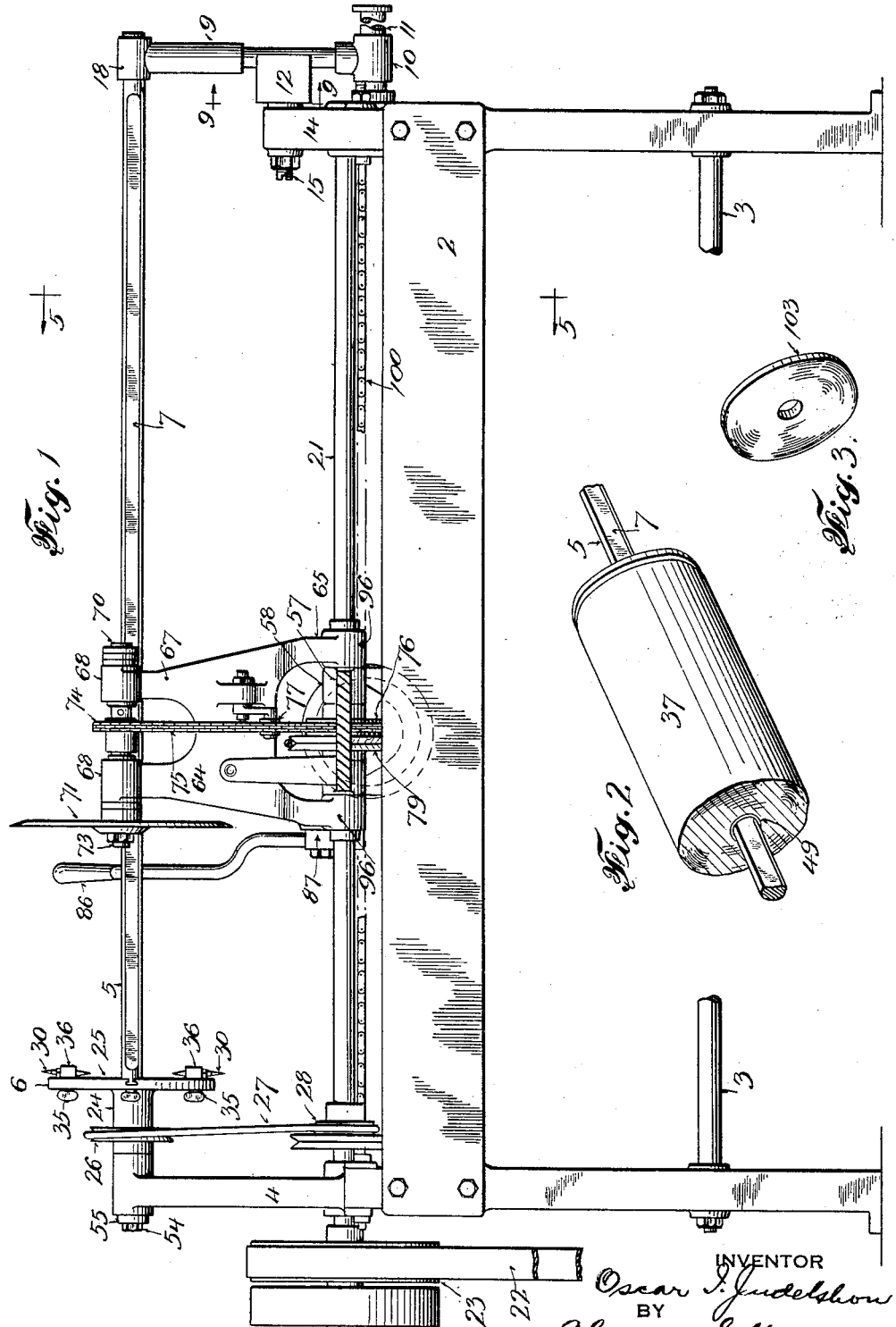

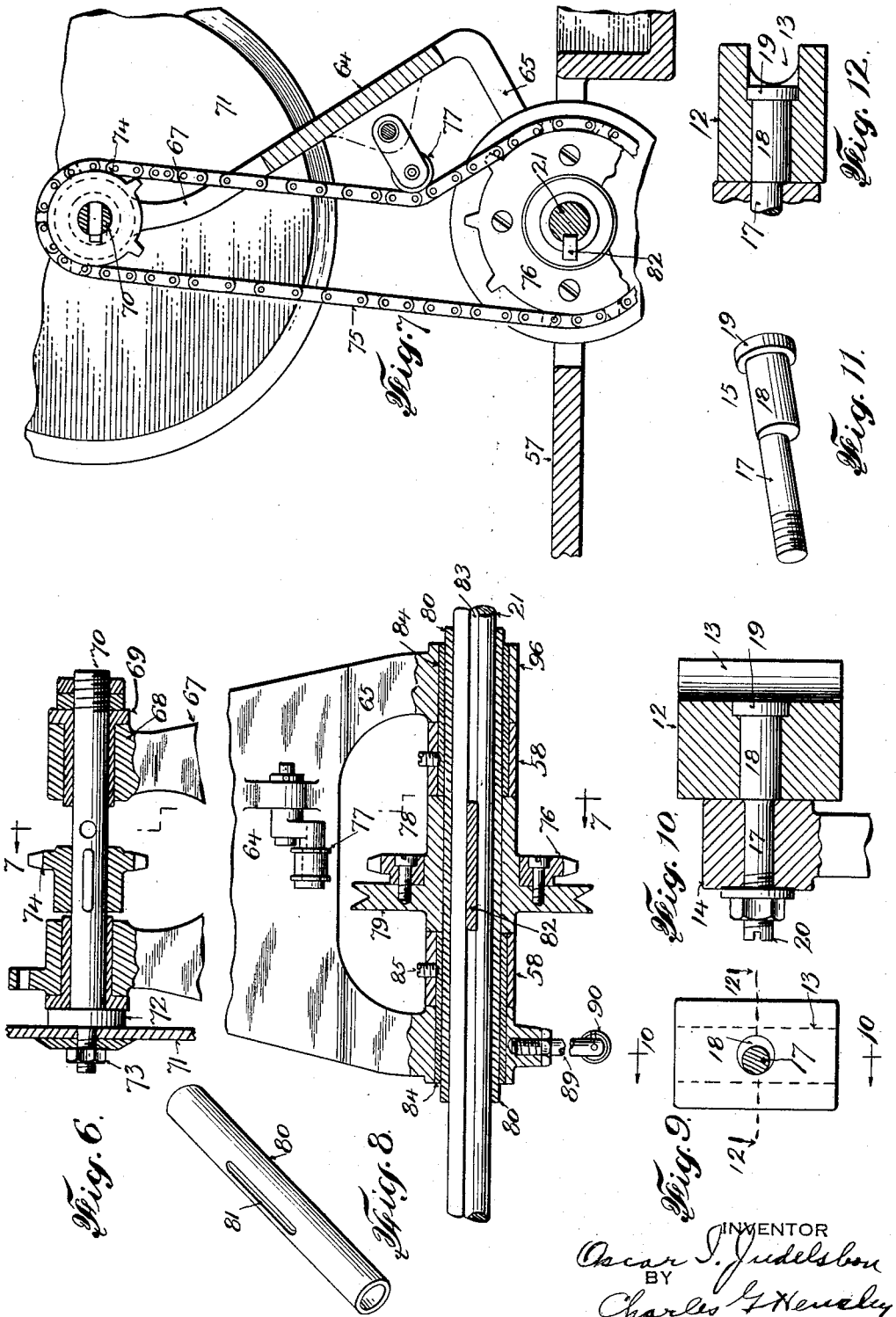

Dec. 27, 1932.  O. I. JUDELSHON  1,892,058
CLOTH CUTTING MACHINE
Filed Jan. 6, 1931   6 Sheets-Sheet 4
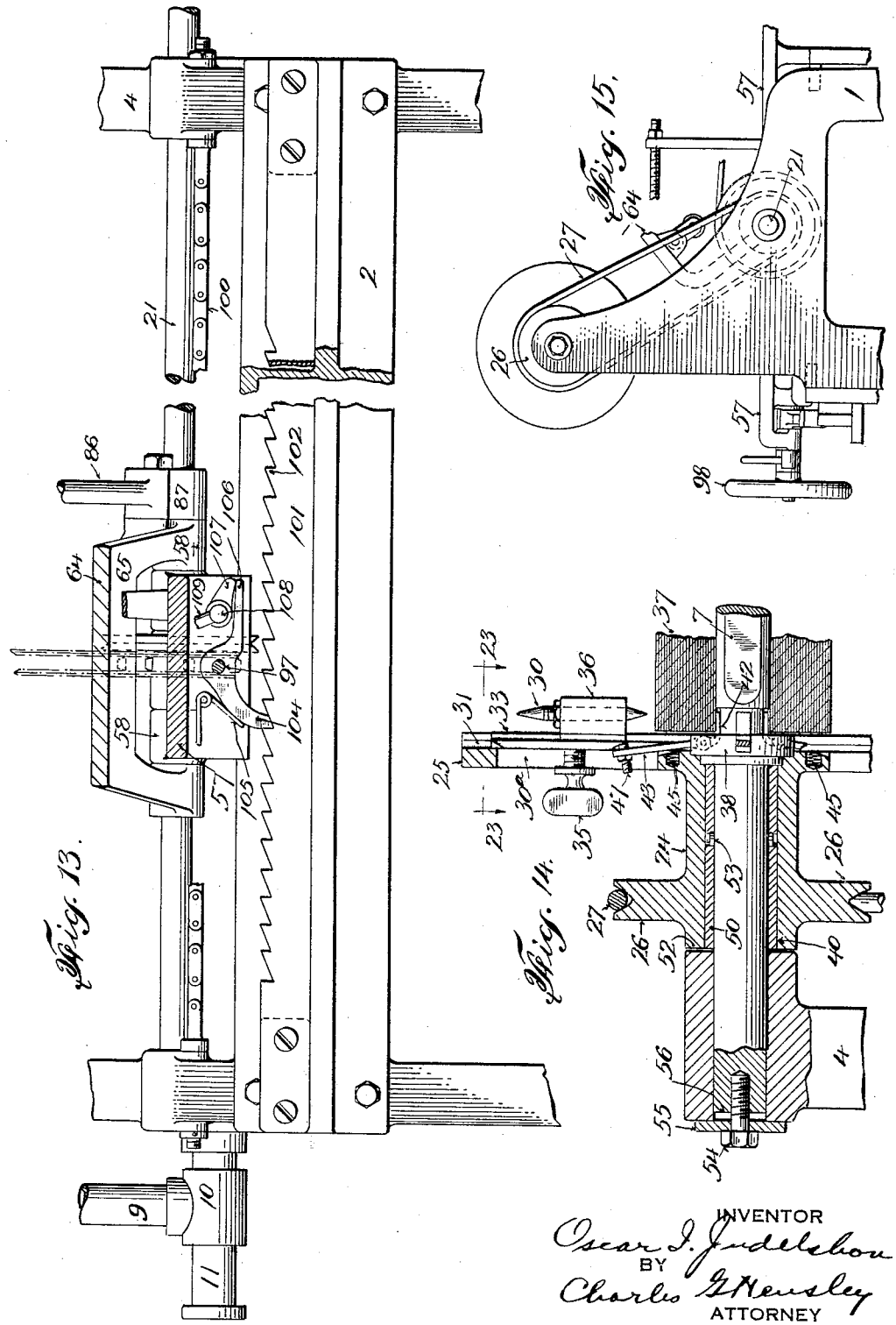
INVENTOR
Oscar I. Judelshon
BY
Charles G. Hensley
ATTORNEY

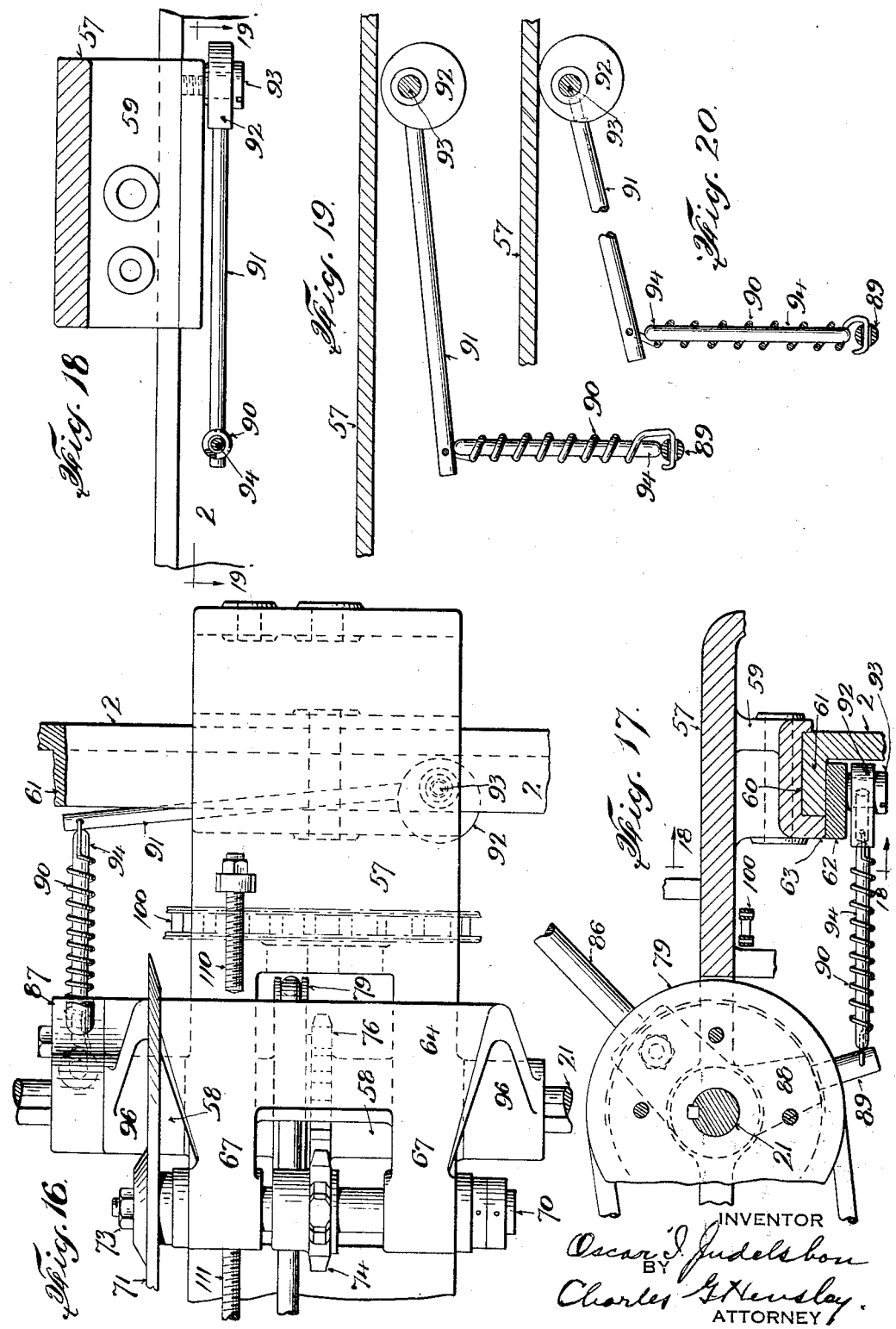

Dec. 27, 1932.  O. I. JUDELSHON  1,892,058
CLOTH CUTTING MACHINE
Filed Jan. 6, 1931   6 Sheets-Sheet 6
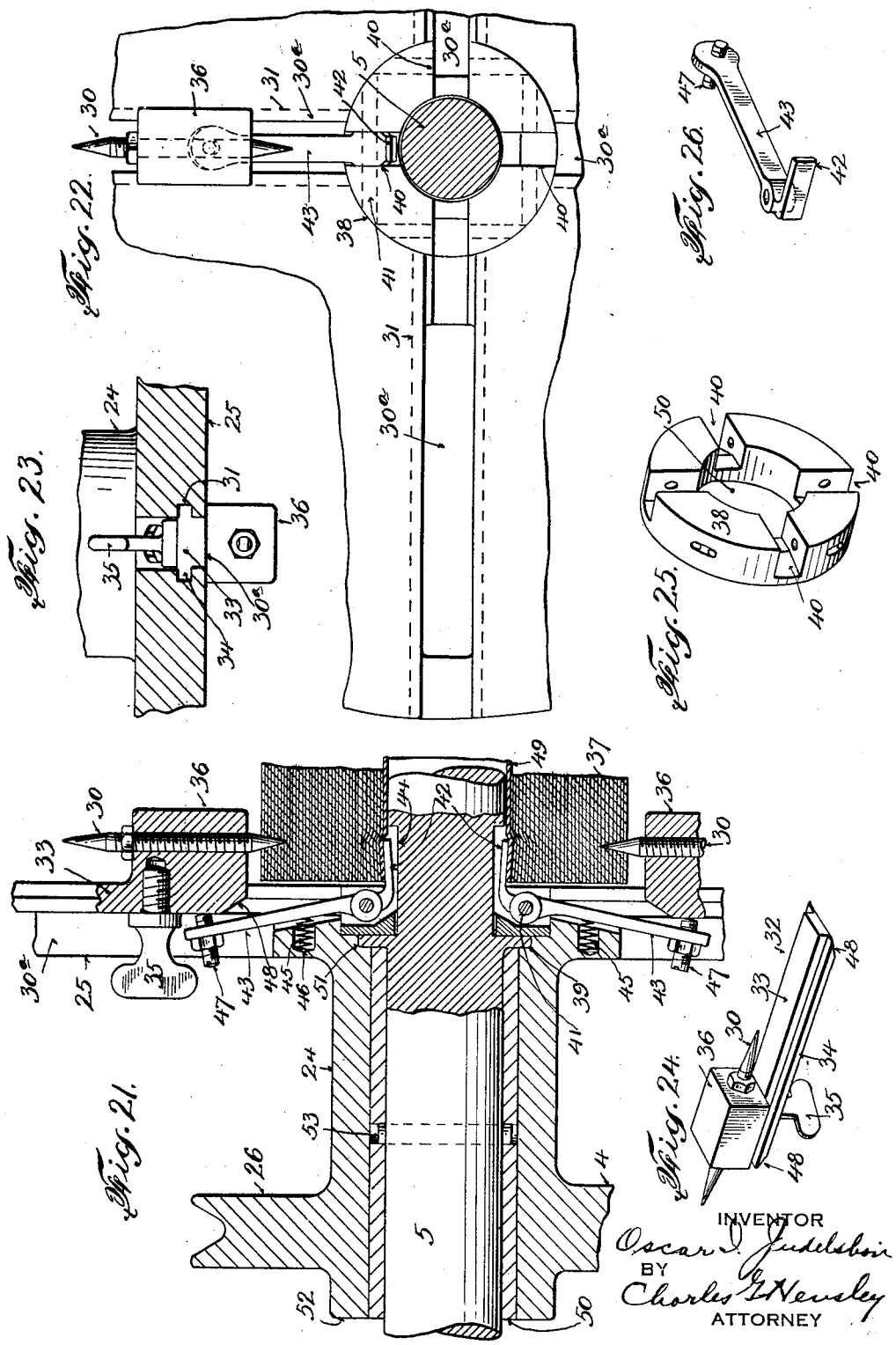
INVENTOR
Oscar I. Judelshon
BY Charles G. Hensley
ATTORNEY Patented Dec. 27, 1932

1,892,058

UNITED STATES PATENT OFFICE

OSCAR I. JUDELSHON, OF PARK RIDGE, NEW JERSEY

CLOTH CUTTING MACHINE

Application filed January 6, 1931. Serial No. 506,895.

My present invention relates to a machine for cutting cloth and it is an improvement on the type of machine shown in my U. S. Letters Patent No. 1,242,448 dated October 9, 1917.

One of the objects of the present invention is to provide a machine for cutting a roll of cloth into a number of separate, narrow disc-like rolls and to so construct and arrange the parts that the axis of the knife may approach closer to the material than in machines heretofore used. One advantage of this is that it permits a larger roll of fabric to be cut through by a knife of any given diameter because the depth of cut is defined by the radial distance from the cutting edge of the knife to the point where the fabric may approach the axis. Heretofore, parts of the mechanism employed for revolving the shaft of the knife have been so placed as to place a limitation upon the close approach of the periphery of the fabric to the axis of the knife, whereas in the present machine the approach is limited only by the size of the knife shaft and the bearing with which it revolves.

Another advantage is that as the knife is continually reduced in diameter by sharpening operations, in the present machine the knife will be serviceable over a longer period of use than in former machines because it may be worn down by sharpening to a smaller diameter before the knife becomes useless. This is also due to the fact that the knife arbor can approach closer to the body of fabric than in former machines.

In former machine of this character the carriage which carries the knife back and forth in various positions of adjustment along the length of the roll of fabric, while guided by a shaft has usually been supported to travel upon rollers which ride upon tracks on the frame of the machine. More or less lint and dust accumulate on a machine of this type and when the lint and dust accumulate on the tracks on which such rollers travel, the movement of the rollers becomes uneven and the carriage is displaced from its natural path of travel, so that the carriage binds in relation to the shaft on which it is guided. To avoid these difficulties in the present machine, the carriage is mounted to travel along the main shaft of the machine and is provided with channel grooves which receive the edges of the beam therein to guide the carriage and to support portions of it without the use of surface rollers. Any lint which may collect on the guiding beams is pushed off by the carriage, or at least forced along the beam so that it cannot affect the position of the carriage as in the case of the rollers formerly used. The method of supporting the carriage in the present case eliminates the necessity of the main shaft supporting any part of the weight of the carriage. As the usual supporting rollers are eliminated, the inaccuracies due to the rollers travelling over the dust or lint covered rails is avoided. This eliminates the tendency of the carriage to bind in relation to the shafts and it prevents distortion of the carriage in relation to the fabric which is to be cut. In cutting binding materials it is sometimes necessary to cut a disc from a roll of fabric of one-sixteenth inch in width and irregularities in the position of the carriage in relation to the fabric will seriously affect the accuracy of the cutting operation, especially when cutting such narrow discs.

The chuck on the fabric shaft which engages and revolves the roll of fabric which is to be cut up must not be free to move lengthwise of the shaft during the cutting operation or the fabric cannot be accurately cut. In previous machines some of the parts became worn and allowed the fabric chuck to move on the fabric shaft sufficiently to affect the accuracy of the cutting operation and it then became necessary to repair the machine to prevent this play of the chuck, generally by providing new bushings. With the present machine it is a simple matter for the user, without the assistance of the machine manufacturer, to remove the chuck bushing, file off the end and replace the bushing and the play or longitudinal movement of the chuck will have been taken up.

Another object of my invention is to provide simple means of adjustment for aligning the fabric shaft to make it parallel with the knife carriage shaft.

Another object of the present invention is to provide a very simple and very positive means for locking the knife carriage during the cutting operation. As the knife cuts through the roll of fabric there is more or less lateral pressure on the knife because the portion which is being cut from the fabric roll is pushed laterally by the knife as it cuts into the main roll. Heretofore inefficient friction devices have been used to lock the carriage and they were not positive enough in holding the carriage against the lateral pressure on the knife. Even a very slight movement of the carriage during the cutting operation will result in inaccuracies. Furthermore, the holding means heretofore used became worn and then failed to hold the carriage.

In the present machine I employ a cam or eccentric which will positively lock the carriage and it will automatically compensate for any wear in the locking parts and it will offer no resistance to the movement of the carriage when released.

Furthermore, I have provided automatic means for applying and releasing the locking means and this is operated automatically by the swinging of the knife. As the knife is swung forwardly to cut into the fabric the carriage locking device is automatically set to lock the carriage before the knife starts to cut the fabric. Conversely, when the knife has completed the cutting operation and is moved back away from the fabric the knife carriage is automatically unlocked so that it may be moved step by step by the ratchet device to position the knife for a successive cutting operation. The operator, therefore, does not pay any attention to the device for locking the carriage as it is automatically controlled by the throwing of the knife into and out of cutting position.

Another object of the invention is to provide an improved chuck for holding the fabric roll and for revolving it. Heretofore, the chuck merely had a set of pins which pierced the fabric near the end of the roll to form the means for gripping the roll of fabric by the chuck. When the roll of fabric was gradually cut down until a small body remained held by the chuck, it tended to pull out from the latter. Furthermore, it was difficult to cut the roll of fabric close down to the gripping means of the chuck so that a substantial piece on the end of the roll of fabric could not be utilized and was often thrown away as waste.

In the chuck forming part of this invention I not only employ the needles for piercing the roll of fabric from the outside adjacent one end thereof, but I also provide clamps which engage from the inside of the cardboard core on which the roll of fabric is wound and press outwardly against this core to form gripping means acting inside the roll of fabric in addition to the pins acting on the outside thereof. This gripping device forms a more positive means for holding the roll of fabric on the chuck and it prevents the final end of the coil of fabric from becoming unwound or disengaged from the chuck. It is also possible to cut the fabric very close to the holding means.

Another object of my invention is to provide a new method of mounting the movable knife carriage slidingly on the main shaft of the machine as well as the sprocket and pulley for driving the revolvable knife and sharpening wheel in order to prevent rapid wear between the main shaft and the parts moving along the same with the knife carriage. There is a keyway in the main shaft in order that the driven members on the knife carriage may slide along the main shaft with the carriage and the edges of this keyway have heretofore caused rapid wear between the main shaft and the driven parts which slide along it. This wear was increased by the fact that the grit from the sharpening stone was sometimes thrown down toward the main shaft and worked into the bearings of the parts which slide along the main shaft and are driven by it. The difficulty referred to is eliminated by the bushing arrangement illustrated in the drawings of the present case.

Other features and advantages will be set forth in the following detailed description of my invention, In the drawings forming part of my application, Figure 1 is a rear elevation of a machine embodying my invention, some of the parts being broken away, Figure 2 is a perspective view of a portion of a roll of fabric on the fabric shaft, Figure 3 shows a disc which has been severed from the large roll, Figure 4 is an end view of the machine, with parts of the frame broken away, Figure 5 is a sectional view taken on the line 5—5 of Figure 1, Figure 6 is a sectional view showing the method of mounting the knife and its arbor on the knife carriage and the method of connecting the driven members of the knife carriage with the main shaft, Figure 7 is a sectional view taken on the line 7—7 of Figure 6, Figure 8 is a perspective view of a bushing on the knife carriage, Figure 9 is a sectional view taken on the line 9—9 of Figure 1, Figure 10 is a sectional view taken on the line 10—10 of Figure 9, Figure 11 is a perspective view of the eccentric for adjusting and aligning the fabric shaft, Figure 12 is a sectional view taken on the line 12—12 of Figure 9, Figure 13 is a longitudinal sectional view of the machine showing the ratchet device for moving the carriage step by step, Figure 14 is a vertical sectional view through the chuck and parts near the same, Figure 15 is an end view of part of the machine, Figure 16 is a plan view of parts on the knife carriage and of the device for locking the carriage, Figure 17 is a vertical sectional view showing the automatic carriage locking device, Figure 18 is a sectional view taken on the line 18—18 of Figure 17, Figure 19 is a sectional view taken on the line 19—19 of Figure 18, Figure 20 is a similar view but showing the parts when the locking device is in position to lock the carriage, Figure 21 is an enlarged sectional view through the chuck showing the parts in the condition at the time the roll of fabric is gripped by the chuck, Figure 22 is a sectional view showing in end elevation the parts shown in Figure 21 except that the roll of fabric is omitted, Figure 23 is a sectional view taken on the line 23—23 of Figure 14, Figure 24 is a perspective view of one of the clamping members of the chuck, Figure 25 is a perspective view of the chuck plate, and Figure 26 is a perspective view of one of the levers used in the chuck for gripping the roll of fabric.

I have shown the working parts of the machine mounted upon a frame which consists principally of standards or end sections 1, disposed at opposite ends of the machine and connected by the longitudinal beams 2 as well as by the lower horizontal tie rod 3. There is an upper extension or bracket 4 rising above one of the end sections 1 and this forms a support for the bearing of one end of the shaft 5 on which the roll of fabric is mounted and which I shall call the fabric shaft. This shaft extends longitudinally in elevated position at the front of the machine, and in the preferred form of the invention this shaft remains stationary, whereas the chuck 6 mounted upon it revolves in order to revolve the roll of fabric in relation to the fabric shaft.

This fabric shaft is provided with a longitudinal groove 7 the greater part of its length, which permits the knife to cut entirely through the roll of fabric, and the paper core on which it is mounted, and therefore it performs the same function as the groove in my aforesaid patent. The right hand end of the fabric shaft in Figure 1 has its bearing in a bearing block 8 which is part of an arm 9 the latter having a hub 10 on its lower end which is supported upon the shaft 11 which extends longitudinally of the machine in a position below but parallel with the fabric shaft.

This arm 9 is slidable along the projecting end of the shaft 11 a sufficient distance to permit the bearing 8 to be disengaged from the end of the fabric shaft when the roll of fabric is about to be placed on the latter. There is a block or guide 12 having a curved pocket 13 into which the arm 9 is moved and this block serves to hold the arm in a correct vertical position while the machine is in operative condition.

The guide block 12 is held against a bracket 14 of the machine frame by means of the bolt 15 which passes through a bore in the block and through the bracket 14 being secured by the nut and washer 16. This bolt has a shank 17 which fits the bore of the bracket 14 and it has an enlarged portion 18 which is eccentric to the axis of the smaller portion 17 and the head 19 which prevents movement of the block 12 in one direction, is also eccentric to the shank 17 and is concentric with the portion 18.

By slacking off the nut 16 and applying a screw driver to the slot 20 in the end of the shank portion 17 the bolt as a whole may be turned in the bracket 14 so that the eccentric portion 18 will shift the block 12 in a horizontal direction to vary the angle of the supporting rod 9 for the purpose of aligning or truing the position of the fabric shaft in relation to other parts of the machine. This forms a very simple device for aligning the fabric shaft and it also forms a very simple means for holding the arm 9 in correct position and permitting it to be disengaged from the fabric shaft when a roll of fabric is to be applied to the latter.

The main drive shaft 21 of the machine extends longitudinally thereof and is journaled in the two end frames in a position below and to the rear of the fabric shaft. The main shaft may be operated by means of the belt 22 operating on the pulley 23 fixed to the end of the main shaft.

On the fabric shaft 5 adjacent one end thereof there is revolvably mounted a sleeve 24 which carries the chuck plate 25 and this sleeve has a pulley 26 which is operated by means of the belt 27 which also engages around a pulley 28 on the main shaft.

The chuck plate has radially disposed grooves 30$^a$ and each has T slots 31 on opposite sides of the grooves 30$^a$ to form tracks or guides for the radially adjustable clamps 32. These clamps are each composed of the sliding member 33 having the flanges 34 adapted to be guided in the T slots 31 of the chuck plate so that they may be shifted in a direction radially of the chuck plate. The slides 33 are adapted to be locked in various positions of adjustment by means of the wing bolts 35 threaded into apertures in the blocks 36 in which the piercing pins 30 are mounted.

By means of the wing bolts 35 which clamp the several slides in various positions of adjustment on the chuck plate the piercing pins 30 may be set to pierce the outer portion of the roll of fabric 37 which is mounted on the fabric shaft 5.

There is a ring member 38 passed over the fabric shaft and resting against the flange 39 thereof which ring is set into a socket in the front face of the chuck plate. This ring is provided with a number of slots 40 in which pins 41 are mounted to form fulcrums for small levers consisting of the clamping fingers 42 and of the longer arms 43. The fingers 42 of these clamping levers are adapted to move partly in the slots 40 of the ring 38 and partly in the longitudinal recesses 44 formed at several places around the shaft 5 as shown in Figures 14 and 21. There is a coiled spring 45 for each of the clamping levers, the springs being disposed in the sockets 46 in the chuck plate so that they press forwardly on the lever arm 43 to urge it toward the right in Figure 25, which is the direction necessary to release the clamping fingers 42.

The upper ends of the lever arms 43 are provided with adjustable stop screws 47 which are adapted to be engaged by either of the slanting surfaces 48 on the clamp slides 33 for the purpose of positively swinging the arms 43 toward the left to the position shown in Figure 21. All of the several levers 42, 43 are alike and four are shown disposed 90° apart around the ring 38. It will be understood that the slides 33 may be inserted either end inwardly in the T slots 31 according to whether a small or large roll of fabric is to be held by the chuck, and therefore I have provided the slanting surfaces 48 on each end of the slide, so that either of these slanting surfaces will operate against the stop screws 47 to actuate the clamping levers.

The roll of fabric is generally wound on a cardboard core 49 of the inner diameter of which fits the periphery of the shaft 5. The clamping fingers 42 engage the interior of the core as shown in Figure 21.

The sleeve 24 of the chuck fits over a bushing 50 and at one end it abuts against the outwardly extending flange 51 of this bushing to limit the end thrust of the chuck in one direction. One end of the bushing 50 abuts against the bracket 4, and the end thrust of the chuck is limited in one direction by the end 52 touching the bracket 4. The bushing 50 is attached to the shaft 5, preferably by a pin 53 passing through the shaft and partly through the bushing so that the bushing will not revolve on the shaft but the chuck will revolve on the bushing.

The distance between the shoulder 51 of the shaft 5 and the end of the bracket 4 when the parts are correctly proportioned will be such as to permit the chuck to revolve freely on the bushing but endwise movement of the chuck is limited in order that the chuck and roll of fabric cannot shift sufficiently to destroy the accuracy of the cutting operation.

There is a screw bolt 54 threaded into one end of the shaft 5 and the head of this presses against a washer 55 which rests against one side of the bracket 4 as shown in Figure 14. In the position of the parts shown in this figure the shaft 5 is drawn toward the left by the screw bolt 54 and as the left end of the shaft is separated from the washer 55 the pull on the shaft causes the bushing 50 which is pinned to it, to be pressed against one side of the bracket 4. If the parts become worn after long use the chuck may shift endwise. This may occur when wear takes place on the left face of the flange 51 of the shaft, or on either or both ends of the chuck or upon the right face of the bracket 4 or all of these surfaces may wear, and as a result the chuck may shift endwise between the flange 51 and the face of the bracket 4.

When this occurs the machine may be restored to a condition which will prevent end shift of the chuck and this may be done by the user of the machine as follows: The bolt 54 is removed from the end of the fabric shafts 5 to permit the shaft to be withdrawn from the bracket 4, and to permit the bushing 50 to be removed from the shaft. The left hand end 56 of the bushing is then filed or ground off the required amount and the parts are reassembled to the condition shown in Figure 14.

When the bolt 54 has been tightened in the shaft 5 the end 56 of the bushing will be pressed against the bracket 4. The distance between the left face of the bushing and the right face of the bracket 4 will have been shortened by the filing or grinding of the end 56 of the bushing in the manner above described, this shortening being sufficient to equal the wear in the parts. The chuck can then not shift endwise and affect the accuracy of the cutting operation. In other words, the play caused by wear has been taken up and the parts will operate the same as before the wear occurred. This operation of taking up for wear may be repeated when necessary to keep the parts in accurate condition.

The movable carriage for the knife is shown as consisting partly of a plate 57 which is disposed horizontally and has hubs 58 fitting around the shaft 21. The plate 57 of the carriage has a depending portion 59 at the front of the machine which is provided with a socket 60 which is adapted to slidingly engage the top flange 61 of one of the beams 2 which extend longitudinally of the machine frame. The socket 60 is adapted to engage not only with the rear edge of the flange 61 but the top surface and a portion of the front of the flange, in order to form a three-sided engagement between the surfaces of the socket 60 and the upper portion of the beam 2. There is a plate 62 which is attached to the bottom edge of the member 63 having the socket 60 which plate engages the under surface of the flange 61 of the beam to co-operate in forming a guide, so that the carriage plate cannot move in any direction except lengthwise of the beam 2.

Preferably, the parts at the rear side of the machine are duplicated so that the plate 57 has the same character of sliding engagement with the rear beam 2 that it has with the front beam.

There is a plate 64 of the peculiar shape illustrated in Figure 7, which plate has a yoke 65 on its lower end provided with sockets 96 adapted to surround the main shaft 21 and the bushing secured thereon. The upper end of the plate 64 is provided with another yoke 67 having bearing members 68 which receive therein the bushings 69 and in the bores of these bushings is journaled the arbor 70 which carries the revolvable cutting knife 71 the latter being secured against the head 72 of the arbor by means of a bolt 73. There is a sprocket wheel 74 having a key connecting it with the knife arbor and this sprocket is operated by means of an endless chain 75 which also travels around a sprocket 76 which is mounted on the shaft 21.

It will be noted that one run of this chain passes through the opening of the yoke 67 so that this run of the chain is carried to the back of the plate 64 where it is engaged by an adjustable idler 77 which takes up slack in the chain and serves as a guide. The disposition of the chain in relation to the arbor of the knife is such that the latter may move much closer to the roll of fabric which is being cut on the fabric shaft than in machines as heretofore constructed, because the chain 75 is carried back through the supporting plate 64. The knife may, therefore, be moved toward the roll of fabric to a point limited only by the diameter of the sprocket wheel 74. This makes it possible to use the knife after it has been considerably reduced in diameter by repeated resharpenings.

The sprocket 76 which drives the chain 75 is shown as mounted upon the hub 78 of the pulley wheel 79 being attached against the face of the latter by screws whereby the sprocket and the pulley move as a unit. There is a bushing 80 shown separately in Figure 8 which fits over the shaft 21 and is sufficiently long to extend through both of the hubs 96 of the yoke 65. This bushing, therefore, not only extends through these hubs but it also extends through the hubs 58 forming part of the knife carriage and it also extends through the hub 78 which carries the sprocket and pulley. This bushing 80 is provided with a slot 81 extending through it and through this slot there projects a key 82 which also extends through the hub 78 which carries the sprocket and pulley and projects into the keyway 83 of the shaft 21 so that this hub is keyed to the shaft 21 to be revolved therewith. As the key 82 projects through the bushing 80 and latter will be revolved with the shaft 21. There are other bushings 84 fitting over the bushing 80 at opposite ends thereof and of sufficient length to extend through the hubs 96 of the yoke 65 and through the hubs 58 which are connected with the plate 57 of the knife carriage; and these bushings abut against opposite ends of the hub 78 which carries the sprocket and pulley. It will be apparent that the bushing 80 shown in Figure 6 revolves with the shaft 21 and that the hub 78 and the sprocket and pulley revolve with both the shaft 21 and the bushing 80 by reason of the key 82 which locks the shaft 21, the bushing 80, and the hub 78, to move in unison. The keyway 83 in the shaft 21 extends substantially the length of this shaft or at least throughout that portion over which the carriage has a sliding engagement.

The inner bushing 80 revolves within the two bushings 84, the latter being held from revolving by set screws 85 passing through the hubs 58 and engaging the bushings. The hubs 58 are adapted to oscillate on the outer surfaces of the bushings 84. It will be apparent that by the use of the bushing 80 keyed to revolve with the shaft 21 this eliminates the cutting action which formerly took place between the shaft 21 and the bushing surrounding it. In the present case the edges of the keyway 83 cannot cut or wear the bushing 80 because the latter is caused to revolve with the shaft. There is no cutting action in the hub 78 which carries the sprocket and pulley because this is mounted on and revolves with the bushing 80. There can be no cutting action between the edges of the keyway 83 and the hubs 58 and 96 because the shaft 21 does not come into direct contact with these hubs but the smooth portions of the bushing 80 engage in the bores of the outer bushings 84. The use of the bushing 80 eliminates the cutting action formerly caused by the keyway.

The knife supporting plate 64 which carries the knife and its arbor is adapted to be swung toward and from the fabric shaft by means of an operating arm 86 which is connected with a hub 87 which surrounds the main shaft 21 and is bolted against one of the hubs 96 on the yoke 65. The arm 86 extends forwardly and under the fabric shaft so that it is in position where it can be grasped by the operator at the front of the machine for the purpose of swinging the knife toward and from the roll of fabric mounted on the shaft 5. This is in accordance with common practice.

There is a projection 88 extending downwardly from the hub 87 and in which is mounted a rod 89 to form a lever arm to which one end of the coiled spring 90 is connected. The other end of this spring is connected with a lever arm 91 which is fixed to an eccentric disc or clutch member 92 which is pivotally mounted on a screw 93 attached to the under side of the plate 62 which, as above stated, is connected with the frame of the carriage. The member 92 has a periphery which is eccentric to the pivot screw 93 so that if this member is rotated on the screw the periphery of the member 92 will in one case be forced against the face of the vertical web of the front beam 2 as shown in Figure 20. On the other hand, when the lever arm 91 is moved to the position shown in Figure 19 the member 92 will be turned on its screw 93 sufficiently to disengage the eccentric surface of this member from the face of the beam 2.

I have shown a rod 94 disposed inside the coils of the spring 90 to form a means for making the movement of the lever arm 91 positive in one direction, whereas it is under tension of the spring 90 when moved in the opposite direction. It will be noted that the lever arm 89 is movable with the hub 87 and that the latter is bolted to one of the hubs 96 which swings with the knife support so that whenever the operating lever 86 is operated to swing the knife support, the lever arm 89 is rocked at the same time.

I have shown a ratchet device at the front of the machine which is similar to ratchet devices commonly used for the purpose of causing or effecting a step by step movement of the knife carriage.

There is a shaft 97 extending through the portion 59 of the knife carriage and having its bearings therein and on the front of the machine this shaft carries a wheel 98 which is adapted to be turned by the operator. The same shaft 97 has a small sprocket wheel 99 which engages with a chain 100 extending lengthwise of the machine and having its opposite ends fastened to the end standards of the frame. By revolving the hand wheel 98 in either direction the sprocket wheel 99 will act on the chain 100 to cause the knife carriage to be shifted along the beams 2, either to the right or left, in order to bring the cutting knife in any desired position in relation to the roll of fabric mounted on the shaft 5.

There is a rack bar 101 attached to the front of the machine and it has a row of rack teeth 102 arranged some predetermined distance apart, corresponding with the width of the discs 103 which are to be cut from the roll of fabric, one of the discs being illustrated in Figure 3. If these discs are to be cut to a width of say one-half inch, then the ratchet teeth 102 will be one-half inch in length. If discs of a different size are to be cut, a different rack bar will be substituted on which the teeth will correspond with the width of the discs of fabric which are to be cut. The shaft 97 which is operated by the hand wheel 98 has mounted upon it a pawl 104 adapted to engage the rack teeth 102 on the rack bar, being pressed into engagement therewith by a spring 105 so that the pawl will engage one of the rack teeth as the knife carriage stops in one of the cutting positions.

The pawl 104 has an extension 106 which is adapted to be engaged by a tripping dog 107 mounted on a stud 108 and operated by the lever arm 109 so that whenever this lever arm is turned in one direction the dog 107 presses downwardly on the extension 106 and disengages the pawl 104 from the rack teeth and holds it out of engagement, so that the knife carriage can be moved along the machine without being locked by the pawl in any definite position.

I have shown in Figures 4 and 5 adjustable stop screws 110, 111 arranged in the path of the plate 64 to limit the swinging movement thereof, and therefore determine the two extreme positions, to wit, the forward and rear positions of the cutting knife. The stop screw 110 allows the cutting knife to pass entirely through the roll of fabric and its core and partly into the groove 7 of the fabric shaft but not to touch the latter. From time to time as the knife is reduced in diameter by repeated sharpening operations the stop screw 110 must be readjusted to allow the periphery of the knife to reach into the groove 7, as shown in Figure 5. The rear stop screw 111 will be adjusted to allow the knife to be withdrawn entirely from the fabric and into the correct position to be acted upon by the sharpening wheel 112. I have shown parts of the knife sharpening device in Figure 4 but I will not specifically describe the same as it forms no part of the present invention.

*Operation*

When a roll of fabric such as is shown in Figure 2 is brought to the machine it consists of the cardboard core 49 with a body of fabric wound around it and the diameter of the body of fabric may be different in different cases.

Usually the edges of the fabric at the ends of the roll are not perfectly even so that the first operation is to trim off one end of the roll. For this purpose the arm 9 which supports one end of the fabric shaft is shifted lengthwise on the shaft 11 until the bearing member 8 moves off the end of the fabric shaft 5, at which time the arm 9 will move out of the crotch 13 in the block 12. The arm 9 is thus disengaged from the fabric shaft and from the block 12 and it may be turned on the shaft 11 to move it out of the way for the reception of the roll of fabric onto the fabric shaft. The roll 37 of fabric with its core is then slid onto the shaft 5 until one end thereof is moved upon against or adjacent the face plate of the chuck.

It may here be briefly stated that the roll of fabric is first clamped on the chuck, the machine is operated, and the knife is caused to trim off the end of the roll of fabric opposite to the chuck, after which the roll of fabric is removed from the fabric shaft and reversed, so that the trimmed end is now brought into position against the chuck. Whether this method is followed or not, the description may proceed regardless of whether the end of the roll of fabric adjacent the chuck has been trimmed or left in its irregular condition. When the roll of fabric is moved along the shaft 5 toward the chuck, the sliding members 33 are first moved outwardly along the grooves 30ª, so that the locking pins 30 lie beyond the periphery of the roll of fabric. At such times the clamping levers 42, on the chuck are pressed by the springs 45 acting on the arms 43 so that the gripping fingers 42 are retracted within the grooves 44 in the shaft 5.

The roll of fabric is moved along the shaft 5 until it lies adjacent the face plate of the chuck and the end of the body of fabric and its core project over the slots 44 and surround portions of the gripping fingers 42.

The sliding members 33 after the wing screws 35 have been released, are forced downwardly in their several guiding grooves 30a so that the pins 30 pierce the outer portion of the roll of fabric. At the same time the sliding members are moved downwardly or toward the axis of the shaft 5, one or the other of the slanting surfaces 48 of the sliding members, according to which way the sliding members are facing, will engage the ends of the several stop screws 47, so that as the sliding members are moved downwardly the lever arms 43 are forced toward the left, as shown in Figure 21, in opposition to the springs 45. This will cause the gripping fingers 42 to move outwardly from the slots 44 and press outwardly against the core 49 as shown in Figure 21.

These fingers remain pressing against the inside of the core after the sliding members 33 have been locked in place by the wing screws 35. The chuck is now locked to one end of the roll of fabric, so that the latter may be revolved with the chuck on the fabric shaft 5, the latter remaining stationary. As the chuck members engage the outside of the roll of fabric through the action of the pins 30 and also the inside of the core through the action of the fingers 42, the roll of fabric will not work loose from the chuck. This is true even when the roll of fabric has been gradually cut into separate discs and until the cutting knife is operating close to the pins 30.

Heretofore when the roll has been reduced to a very short length it has been difficult to hold it from pulling away at the center, especially where the diameter of the roll has been large in relation to the length thereof. With the present type of chuck the inner and outer gripping action forms a more positive holding means between the chuck and the fabric and it prevents the roll of fabric pulling apart even when the knife is operating close to the pins 30. Furthermore, the pins 30 may be mounted to operate nearer the extreme end of the roll of fabric than heretofore.

When the arm 9 was disengaged from the shaft 5 to permit the roll of fabric to be mounted on the latter, the arm was again returned into operative position by turning it to bring the bearing member 8 in line with the shaft 5 and then sliding the arm 9 on the shaft 11 until it entered the crotch 13 of the block 12. If the fabric shaft 5 does not align with the shaft 21 the fabric will not be cut at right angles to its axis. If it is found that the shaft 5 is not in alignment with the shaft 21, the nut 16 on the bolt 17 may be loosened and a screwdriver may be inserted in the slot 20 to turn the bolt 17 either to the right or left, so that the eccentric portion 18 will swing the block 12 to the right or left, as the case may be, thus moving the arm 9 until the shaft 5 aligns with the shaft 21. The nut 16 will then be tightened so that the nut and bolt 17 will not turn while the machine is in operation. This forms a very simple device for holding the arm 9 and for adjusting its position whenever necessary to align the shaft 5 with the shaft 12.

It will be noted that the hub 24 which carries the chuck plate revolves on the sleeve 50 and the end of the hub 24 touches one end of the bearing 4 whereas the other end of the hub touches the flange 51 on the shaft 5, or at least the hub is limited in shifting lengthwise by these members and the lengthwise movement of the hub must be limited to a slight extent as otherwise the chuck might shift in relation to the cutting knife while the latter is in operation and cause the latter to operate inaccurately on the fabric. For this reason if appreciable wear takes place at either end of the hub 24 or the members with which it engages, the parts may be adjusted to take up for the wear as hereinabove described.

As has been previously explained, the wear between the shaft 21 and the parts on the knife carriage which engage the shaft has been reduced by reason of the employment of the bushing 80 so that the several parts engaging the shaft 21 have no appreciable play thereon even after long extended use.

As the operator prepares to cut a disc from the roll of fabric he turns the wheel 98 at the front of the machine to move the knife carriage along the main shaft; and at such times the carriage is guided positively along the beams 2 without the aid of any rollers and if any lint has acumulated on the beams 2 it is pushed off by the member having the socket 60, so that it cannot interfere with the position of the knife carriage. When the wheel 98 is turned, the knife carriage is moved lengthwise of the machine so that the edge of the knife is brought into position to cut the fabric at the desired point.

If the lever 109 is thrown into active position the pawl 104 will engage one of the teeth of the ratchet 101 and stop the carriage in some unit position with relation to the roll of fabric. If a previous cut has been made in the fabric and the wheel 98 is turned to move the knife carriage from right to left in Figure 4, the pawl 104 will escape one tooth on the ratchet 101 and this will indicate that the knife carriage has been moved one unit of motion so that a new cut may be made a definite distance from the last, thus controlling the width of the disc 103 which is cut from the roll of fabric.

When the knife carriage has been positioned for a particular cutting operation the operator will grasp the handle 86 and first swing it downwardly for the purpose of rocking the plate 64 which carries the knife and its arbor so that the revolving knife will move at right angles with relation to the roll of fabric and gradually cut through the latter at right angles to its axis. When the knife holder has been swung until the plate 64 engages the stop screw 110 the edge of the knife will have cut entirely through the roll of fabric and through its core and will project partly into the groove 7 of the fabric shaft, insuring a clean and complete operation. Upon the completion of this operation the handle 86 will have been moved upwardly to retract the knife from the fabric and place it where it will be operated on by the sharpening wheel 112.

When the knife holder is swung forwardly in the above operation the chain 75 will move no closer to the fabric than the sprocket wheel 74 and in fact there will be nothing to limit the swing of the knife toward the fabric except the sprocket wheel 74 other than the stop screw 110.

The knife 71 is reduced in diameter by repeated resharpenings so that the radius of the knife is reduced to nearly the depth of cut to be made in the fabric. By curving the plate 64 as shown in the drawings and carrying one run of the chain 75 through this plate, I am enabled to use the knife until its radius decreases to a point where the sprocket 74 might touch the roll of fabric and this permits the knife to be used after its radius has been reduced to a greater extent than on prior machines.

As was pointed out above, it is necessary to lock the knife carriage while the knife is cutting the fabric, as otherwise the cutting action will not be accurate. As the edge of the knife is beveled and the disc 103 is separated from the main roll of fabric by the knife while it is cutting, there is lateral pressure on the knife tending to move the carriage. When the lever 86 is swung downwardly to swing the knife over to cut the fabric the arm 89 moves to the left in Figure 17, thereby pulling on the coiled spring 90 and the opposite end of the latter pulls on the lever arm 91. This causes the eccentric member 92 to be partly revolved on the screw 93 so that its eccentric periphery presses against the face of the beam 2 and the eccentric member then locks the carriage against the beam and prevents it from shifting while the knife is cutting the fabric.

When the lever arm 86 is swung back to retract the knife after a cutting operation, the arm 89 swings to the right, as viewed in Figure 17 and it pushes on the rod 94 which is disposed within the coiled spring, so that the opposite end of the rod presses on the arm 91 to turn the latter and also to revolve the eccentric member 92 on the screw 93.

This movement causes the eccentric member to disengage from the face of the beam 2 thereby leaving the carriage free to be shifted by means of the operating wheel 98 and the parts operated through it. It will be noted that if both the rod 94 and the spring 90 are employed as a connecting means between the lever arm 89 and the lever arm 91 the latter will be positively operated through the rod 94 in one direction and resistibly operated in the opposite direction by the spring. It will be apparent from the foregoing that every time the operator swings the knife over to cut the fabric the carriage is positively locked by the eccentric member 92, just before the knife begins to cut the fabric and until the cutting operation has been completed; but the operator is not obliged to give any attention to the locking of the carriage. Conversely, whenever the knife holder is swung to return the knife to inactive position the eccentric member 92 will be unlocked to permit the carriage to be immediately moved to a new position and the operator is not obliged to give any attention to the unlocking of the carriage.

There will be practically no wear between the periphery of the eccentric member 92 and the face of the beam 2 because these members are not in contact, at least in the form of the invention shown in the drawings, while the carriage is being shifted. If by any chance there should be any wear or any irregularity along the surface of the beam 2 this will be taken up by the action of the coiled spring 90. In other words, it will not be necessary to renew the discs 92 because of any wear, even after long use of the machine. This type of locking device is more positive than any heretofore used and the operation of the locking device is carried out automatically upon the operation of the knife holder.

While I have described one embodiment of my invention in great detail I do not wish to be understood as limiting my invention to this embodiment but to include all structures coming within the scope of the following claims.

Having described my invention, what I claim is:

1. A fabric cutting machine having a shaft adapted to support a roll of fabric, a revolvable cutting knife arranged to cut through said roll of fabric while supported on said shaft, and a detachable bearing device for one end of said fabric shaft, adapted to permit the removal and replacement of the rolls of fabric thereon, including a pivotal supporting member mounted to slide on a shaft, a crotch member adapted to straddle said pivotal member, and eccentric means for adjusting said crotch member to vary the alignment of said fabric supporting shaft.

2. A fabric cutting machine having a shaft adapted to support a roll of fabric, a revolvable cutting knife adapted to cut through the roll of fabric on said shaft, and a detachable support for one end of said fabric shaft, including a pivotal member slidably mounted on a shaft, and having a bearing in one end thereof to receive the end of said fabric shaft, a crotch member adapted to receive therein said pivotal member, an eccentric bolt engaging said crotch member and mounted in a support whereby revolvable adjustment of said eccentric bolt will vary the position of said crotch member to effect alignment of said fabric shaft, and means for securing said eccentric bolt in various positions of adjustment.

3. A fabric cutting machine having a shaft adapted to support a roll of fabric, a revolvable cutting knife adapted to cut through the roll of fabric mounted on said fabric shaft, and a detachable bearing member for one end of said fabric shaft and including a rocking arm having a bearing on one end adapted to slide onto and off the end of said fabric shaft, said arm being mounted slidably on a supporting shaft to permit said arm to be slid onto and off said fabric shaft, a crotch member adapted to engage said swinging arm to hold the same in operative position, an adjusting bolt mounted in a stationary support and provided with eccentric and concentric portions, the concentric portion being mounted in said stationary support and the eccentric portion engaging said crotch member whereby the revolving of said bolt will adjust the crotch member to align said fabric shaft.

4. In a fabric cutting machine the combination of a fabric shaft adapted to support a roll of fabric in position for cutting, a revolvable knife for cutting the roll of fabric on said shaft, and a chuck mounted on said shaft for engaging the end of the roll of fabric, said chuck having members received within the end of the roll of fabric and adapted to press outwardly against the inner wall thereof, and clamping members for engaging the exterior of the roll of fabric on the same end which is engaged by said internal means.

5. In a fabric cutting machine the combination of a fabric shaft adapted to support a roll of fabric in position for cutting, a revolvable knife for cutting the roll of fabric on said shaft, and a chuck mounted on said shaft for engaging the end of the roll of fabric, said chuck having pivotal members mounted thereon and pressing outwardly against the inner wall of the roll of fabric, and clamping members engaging the outer portion of the roll of fabric on the same end in which said pivotal members act whereby said chuck grips the interior and exterior of the end of the roll of fabric.

6. In a fabric cutting machine the combination of a fabric shaft adapted to support a roll of fabric in position for cutting, and a chuck mounted on said shaft for engaging the end of the roll of fabric, said chuck having pivotal members mounted thereon and pressing outwardly against the inner wall of the roll of fabric, and clamping members engaging the outer portion of the roll of fabric on the same end which said pivotal members act whereby said chuck grips the interior and exterior of the end of the roll of fabric, and means operating on said pivotal members to forcibly press the portions which engage the interior of the roll of fabric against the same.

7. In a fabric cutting machine the combination of a fabric shaft adapted to support a roll of fabric in position for cutting, said fabric shaft having a recess therein and a chuck on said shaft for holding said roll of fabric, said chuck having pivotal members disposed partly in the recess of said shaft and having fingers adapted to press outwardly against the inner wall of the roll of fabric to grip the roll of fabric.

8. In a fabric cutting machine the combination of a fabric shaft adapted to support a roll of fabric in position for cutting, said fabric shaft having a recess therein and a chuck on said shaft for holding said roll of fabric, said chuck having pivotal members disposed partly in the recess of said shaft and having fingers adapted to press outwardly against the inner wall of the roll of fabric, and piercing members adapted to engage the outer portion of the roll of fabric on the same end on which said fingers act whereby said chuck will grip both the exterior and interior of the roll of fabric.

9. In a fabric cutting machine the combination of a fabric shaft adapted to support a roll of fabric in position for cutting, and a chuck mounted on said shaft for engaging the end of the roll of fabric, levers pivoted on said chuck and having fingers engaging the inner wall of the fabric to press outwardly thereon, said chuck including a face plate and clamps adjustable radially of said face plate and provided with members for piercing the outer portion of the roll of fabric, said levers having arms engaged by said adjustable clamps and adapted to be forced thereby to cause said fingers to press outwardly on the inner wall of the roll of fabric.

10. In a fabric cutting machine the combination of a fabric shaft adapted to support a roll of fabric in position for cutting, and a chuck mounted on said shaft for engaging the end of the roll of fabric, said shaft having a recess and said chuck including a face plate, pivotal levers having fingers extending into the recess in said shaft and adapted to press outwardly against the inner wall of the roll of fabric, said levers having arms extending radially outwardly from said shaft, said chuck having clamping members and means for securing the same in different positions radially of said plate, said clamping members having piercing members for engaging the outer portion of the roll of fabric and having cam surfaces for engaging the outwardly extending arms of said levers to rock the levers and force said fingers into engagement with the interior wall of the roll of fabric.

11. In a fabric cutting machine the combination of a fabric shaft adapted to support a roll of fabric in position for cutting, and a chuck mounted on said shaft for engaging the end of the roll of fabric and having a face plate, pivotal levers having fingers projecting into the end of the roll of fabric and adapted to press outwardly against the inner wall thereof, said levers having arms extending radially outward, said face plate provided with radial grooves, clamping members slidable in said grooves and reversible end to end, said clamping members having double ended pins for piercing the outer portion of the roll of fabric, means for securing said clamping members in adjustable positions, said clamping members having cam surfaces on opposite ends, either of which is adapted to act on said levers to press said fingers outwardly against the inner wall of the fabric.

12. In a fabric cutting machine a non-revolving fabric shaft adapted to support a roll of fabric for cutting, a revolvable chuck mounted on said shaft and adapted to engage the roll of fabric to revolve the same on said fabric shaft, a bushing for said chuck mounted on said shaft, a bearing for one end of said shaft, a shoulder on the shaft between which and said bearing said bushing and chuck are adapted to revolve, and means for drawing said shaft toward said bearing and adapted to be adjusted to take up for end wear of said chuck.

13. In a fabric cutting machine a non-revolving fabric shaft adapted to support a roll of fabric for cutting, a revolvable chuck mounted on said shaft and adapted to engage the roll of fabric to revolve the same on said fabric shaft, a bushing for said chuck mounted on said shaft, a bearing for one end of said shaft, a shoulder on the shaft between which and said bearing said bushing and chuck are adapted to revolve, a screw threaded into the end of said shaft and a cap engaging one end of said bearing and through which said screw projects, said screw being adapted to draw said shaft into said bearing to take up for end wear on said chuck.

14. A cloth cutting machine including a frame, means for supporting a roll of fabric in position to be cut, a carriage movable parallel with the roll of fabric, a revolvable knife mounted on said carriage and adapted to cut through the roll of fabric, an eccentric co-operating with a portion of the frame to lock said carriage in stationary position during the cutting operation, and means for operating said eccentric means, said eccentric means being adapted to be disengaged from said frame during shifting of said carriage.

15. In a machine for cutting fabric a frame, means for supporting a roll of fabric in position to be cut, a carriage adjustable along said frame, a revolvable knife mounted on said carriage and adapted to cut through the roll of fabric, means for moving said knife toward and from the axis of the roll of fabric for the cutting operation, and means for locking said carriage during the cutting operation, said latter means being automatically locked by the movement of said knife toward the axis of the fabric and unlocked by the movement of said knife in the opposite direction.

16. In a cloth cutting machine a frame, means for supporting a roll of fabric in position to be cut, a revolvable knife mounted on a pivotal support whereby the knife may be moved toward and from the axis of the roll of fabric, a carriage on which said pivotal support is mounted, said carriage being adjustable along said frame parallel with the roll of fabric whereby the knife may be caused to cut through the fabric at different points in its length, and means for locking said carriage during the cutting operation, said latter means being automatically locked by the movement of said knife into the fabric and automatically unlocked by the movement of said knife away from the fabric.

17. In a cloth cutting machine a frame, means for supporting a roll of fabric in position for cutting, a revolvable knife mounted on a pivotal support to be moved toward and from the axis of the roll of fabric, a carriage on which said pivotal support is mounted, said carriage being movable in the direction of the length of the roll of fabric, an eccentric member for locking said carriage in different positions of adjustment, and means operated automatically with the operation of said pivotal support whereby the carriage is locked when the knife is moved into the fabric and is automatically unlocked when the knife is moved out of the fabric.

18. In a cloth cutting machine a frame, means for supporting a roll of fabric in position for cutting, a revolvable knife mounted on a pivotal support to be moved toward and from the axis of the roll of fabric, a carriage on which said pivotal support is mounted, said carriage being movable in the direction of the length of the roll of fabric, an eccentric member for locking said carriage in different positions of adjustment, a lever arm for moving said eccentric and means operated automatically with the swinging of said knife support to move said eccentric operating arm positively in one direction and resistibly in the opposite direction.

19. In a fabric cutting machine a frame, means for supporting a roll of fabric in position to be cut, a revolvable knife mounted on a pivotal support to be moved toward and from the axis of the roll of fabric, a carriage adjustable in position on said frame in the direction of the length of the roll of fabric for the knife to cut the fabric at different points, an eccentric engaging a portion of said frame to lock said carriage in different positions of adjustment, an arm connected with said eccentric, an arm connected to move with said pivotal support, a rod connected with said latter arm, and a coiled spring surrounding said rod and connecting said first and said second mentioned arms whereby the movement of said knife support in one direction will positively disengage said eccentric from said frame and will move the same into locking engagement with said frame through the action of said spring.

20. In a cloth cutting machine a frame, including longitudinal beams, a drive shaft, a fabric supporting shaft, a movable carriage adjustable lengthwise of the machine and having a revolvable knife mounted thereon and movable toward and from the roll of fabric, said carriage frame having a sliding engagement with said driving shaft and having bearing members slidably mounted on said longitudinal beams of the frame whereby foreign material collecting on said frame where the same is engaged by said bearing members will be pushed off thereby.

21. In a cloth cutting machine a frame, a longitudinally extending drive shaft mounted thereon, and provided with a keyway, means for supporting a roll of fabric in position for cutting, a carriage having a cutting knife adapted to act on the roll of fabric, said carriage being adjustable lengthwise of the machine and having bearings disposed around said drive shaft, a revolvable power transmitting member mounted on said drive shaft, a sleeve surrounding said shaft and extending through said bearing members and said power transmitting members, and a key extending through said bushing to connect said power transmitting member with said shaft to be operated thereby.

22. In a cloth cutting machine a frame, a longitudinally extending drive shaft mounted thereon and provided with a keyway, means supporting a roll of fabric in position for cutting, a carriage having a cutting knife adapted to act on the roll of fabric, said carriage being adjustable lengthwise of the machine and having bearings disposed around said drive shaft, a revolvable power transmitting member mounted on said drive shaft, a sleeve surrounding said shaft and extending through said bearing members and said power transmitting members, and a key extending through said bushing and entering said keyway in the shaft to connect said power transmitting member with said shaft to be operated thereby.

23. A fabric cutting machine including a frame, means for supporting a roll of fabric in position to be cut, a power shaft arranged parallel with the roll of fabric and provided with a keyway, a knife carriage having a knife supported thereon and adapted to be moved into and out of the fabric to cut the same, said knife carriage having bearing members surrounding said driving shaft and movable along the same, a member for transmitting power to said knife and mounted on said driving shaft to move along the same with said carriage, a sleeve surrounding said shaft and having an opening therein, a key extending through the opening of said sleeve and into the keyway of said drive shaft for connecting said power member operatively with said power shaft and bushings surrounding said sleeve and disposed in the bearing members of said carriage.

24. In a fabric cutting machine a frame, means for supporting a roll of fabric in position to be cut, a drive shaft parallel with the roll of fabric and provided with a keyway, a carriage having a knife movably supported thereon and adapted to cut the roll of fabric, said carriage having spaced bearings surrounding said drive shaft, a member for transmitting power to said knife, mounted on said drive shaft in spaced relation to said carriage bearings, spacing rollers disposed between the ends of said transmitting member and the bearings of said carriage, an apertured sleeve surrounding said power shaft and extending through said carriage bearings, said collars and said transmitting member, a key extending through the aperture of said sleeve and into said keyway for connecting said transmitting member in operative relation with the shaft and permitting said transmitting member to move along said shaft with said carriage, and bushings extending through said carriage bearing members and said collars and disposed on opposite ends of said transmitting member.

25. A cutting machine having means for supporting a body of material in position to be cut, a pivotal support mounted on a shaft and having an extended portion carrying an arbor, a revolvable knife mounted on said arbor and adapted to cut the body of material, said pivotal support being disposed to permit a close approach of said arbor to the body of material, a sprocket mounted on said arbor, a sprocket mounted on the shaft on which said pivotal support is mounted, an endless chain travelling around said sprockets and extending backwardly through said pivotal support whereby said arbor may make a close approach to the body of material.

Signed at the city, county and State of New York, this 17th day of September, 1930.

OSCAR I. JUDELSHON.